United States Patent Office 3,563,969
Patented Feb. 16, 1971

3,563,969
PROCESS FOR PREPARATION OF VINYL BENZYL HALIDE POLYMERS AND THEIR QUATERNARY AMMONIUM SALTS
Bonnie F. Hartenstein, Midland, Mich., assignor to The Dow Chemical Company, Midland, Mich., a corporation of Delaware
No Drawing. Filed Dec. 3, 1968, Ser. No. 780,881
Int. Cl. C08f 7/04, 27/02, 27/08
U.S. Cl. 260—93.5                                    12 Claims

ABSTRACT OF THE DISCLOSURE

An improvement in a process for preparing and purifying vinyl benzyl halide polymers and the quaternary ammonium salts thereof, such as vinyl benzyl trimethyl-ammonium chloride polymers, wherein the reaction product containing the vinyl benzyl halide polymer or the quaternary ammonium salt thereof is in the form of an emulsion having an organic liquid phase and an aqueous phase, said improvement comprising the steps of (1) dispersing in the emulsion up to about 100 p.p.m. based on the volume of the emulsion of a polysiloxane compound and (2) withdrawing the organic liquid layer from the aqueous layer.

BACKGROUND OF THE INVENTION

This invention relates to an improvement in a process for preparing and purifying vinyl benzyl halide polymers and their quaternary ammonium salts.

Polymers of vinyl benzyl quaternary ammonium salts are very useful as electroconductive coating materials, particularly electroconductive materials which are suited for coating paper and wood substrates and the like.

Such polymers are generally prepared by a process having the steps of (1) halomethylating a styrene polymer in an organic diluent in the presence of a halomethylating catalyst such as aluminum chloride, (2) deactivating the catalyst by adding an aqueous liquid thereby forming an emulsion having an oil phase containing the vinyl benzyl halide polymer and an aqueous phase, and (3) aminating the vinyl benzyl halide polymer to form a quaternary ammonium salt of the polymer which is dissolved in the aqueous phase of the emulsion. In isolating the vinyl benzyl halide polymer from the emulsion produced by deactivating the catalyst, it has been the practice in the art to allow the emulsion to separate into two layers over a relatively long period of time or to mechanically separate the two layers by centrifugation and the like. The organic liquid layer is then withdrawn and the liquid is removed to yield the desired product. Neither technique is completely satisfactory from an economic standpoint. In isolating the quaternary ammonium salt of a vinyl benzyl polymer, it has been the practice of the art to distill the organic liquid from the emulsion until an aqueous residue containing the desired quaternary ammonium salt remains. Not only is such distillation time consuming, but prolonged heating tends to be detrimental to the desired product and, moreover, all of the non-volatile by-products and residues which are soluble in the organic liquid phase of the emulsion are left behind to contaminate the aqueous liquid solution of the polymeric salt product. In addition, it is generally not feasible for economic reasons to separate the organic and aqueous phases by mechanical techniques.

In view of the problems arising in methods of the prior art, it would be highly desirable to provide a method for preparing and purifying the aforementioned polymers in which time consuming distillations of organic liquids or long separating periods are essentially eliminated.

SUMMARY OF THE INVENTION

In accordance with the present invention wherein vinyl benzyl halide polymers and quaternary ammonium salts thereof are prepared by (a) halomethylating a styrene polymer in an organic liquid solvent in the presence of a halomethylating catalyst, (b) adding an aqueous liquid to deactivate the halomethylating catalyst and thereby forming an emulsion having an organic liquid phase containing the vinyl benzyl halide polymer and a aqueous liquid phase and (c) introducing a tertiary amine into the emulsion to form the quaternary ammonium salt of the polymer which is dissolved in the aqueous phase of the emulsion, isolation of the vinyl benzyl halide polymers and their quaternary ammonium salts are readily attained by carrying out an improvement comprising the steps of (1) dispersing in the emulsion up to about 100 p.p.m. by volume based on the emulsion of a polysiloxane compound thereby causing the emulsion to "break" and form distinct layers of the liquid phases and (2) withdrawing the organic liquid layer from the aqueous layer. In the case where the vinyl benzyl halide polymer is to be isolated, the organic layer is retained and is concentrated further by evaporating the organic liquid. The vinyl benzyl halide polymer in an oil solution may then be aminated by adding aqueous tertiary amine to form the quaternary ammonium salt. In most instances it is more practical to prepare the quaternary ammonium salt directly by adding tertiary amine or aqueous tertiary amine to the emulsion containing the vinyl benzyl halide polymer. In this instance the polysiloxane is added after the amination step and the resulting aqueous layer containing the desired quaternary ammonium salt is retained. The aqueous layer can be concentrated to an aqueous residue of the polymeric product by distilling the aqueous liquid for a period which is less than one fourth of the time required to distill both the aqueous and organic layers. The polymeric vinyl benzyl quaternary ammonium salts are useful as precipitating or flocculating agents for removing soluble acidic substances from aqueous solutions and as electroconductive coatings for paper and the like.

DECRIPTION OF THE PREFERRED EMBODIMENTS

The improvement of this invention is employed in a process for preparing and purifying vinyl benzyl halide polymers and polymeric vinyl benzyl quaternary ammonium salts wherein (a) a styrene polymer is halomethyled by reacting it with halomethyl methyl ether in the presence of a halomethylating catalyst such as zinc chloride, (b) an aqueous liquid is added to the reaction mixture to deactivate the halomethylating catalyst and thereby form an emulsion having an oil phase containing the vinyl benzyl halide polymer and an aqueous phase, (c) a tertiary amine is added to the emulsion to form the polymeric vinyl benzyl quaternary ammonium salt which is dissolved in the aqueous phase of the emulsion and (d) the organic liquid is removed from the emulsion. The improvement is a method for separating the organic liquid from the emulsion containing the vinyl benzyl halide polymer or the emulsion containing the polymeric vinyl benzyl quaternary ammonium salt, said improvement comprising the steps of (1) dispersing in the emulsion up to 100 p.p.m. by volume based on the emulsion of a polysiloxane compound and (2) withdrawing the resulting organic liquid layer from the resulting aqueous layer.

By the term "vinyl benzyl halide polymer" is meant the halomethylated homopolymers and copolymers of styrene and alpha-methyl styrene which are typically soluble in organic liquids. Such polymers are readily prepared by dissolving the styrene polymer in halomethyl methyl ether and subsequently introducing a halomethylating catalyst such as zinc chloride, preferably in the form of an anhydrous powder, into the mixture. For a complete description of the vinyl benzyl halide polymers and methods for preparing them, see U.S. Pat. 2,694,702.

Tertiary amines typically used for aminating the polymerized vinyl benzyl halide are tertiary monomaines. Examples of suitable amines include trimethylamine, triethylamine, tributylamine, tripropylamine, triamylamine, diethylmethylamine, benzyldimethylamine, dimethylphenylamine, diethylaniline, methyldiethanolamine, dimethylethanolamine, dimethylisopropylamine, dimethylbutylamine and the like. Mixtures of any two or more of such tertiary amines may also be used.

Polysiloxane compounds suitable for use in this invention are water-dispersible polysiloxanes having the configuration

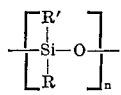

wherein R and R' each represents individually a monovalent hydrocarbon radical and $n$ is the average number of units in the polymer molecules. Examples include the dialkyl polysiloxanes, e.g., dimethyl polysiloxane, diethyl polysiloxane, dipropyl polysiloxane, ethyl methyl polyslloxane, propyl n-butyl polysiloxane; the diaryl polysiloxanes, e.g., diphenyl polysiloxane, di-ar-methylphenyl polysiloxane and the like; and the alkyl aryl polysiloxanes, e.g., methyl phenyl polysiloxane, ethyl phenyl polysiloxane, ethyl ar-methylphenyl polysiloxane and the like. Said polysiloxanes optionally contain up to about 10 weight percent based on polysiloxane of silica.

The polymeric benzyl quaternary ammonium salts prepared by the improved process of this invention include homopolymers and copolymers of quaternary ammonium compounds having the general formula:

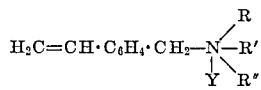

wherein R, R' and R" each represents individually a monovalent radical selected from the group consisting of $CH_2OH—CH_2—$, $CH_3—CHOH—CH_2—$,

and alkyl, aryl, cycloalkyl and arlkyl hydrocarbon radicals, and R, R' and R" collectively represent the trivalent radical of the fromula

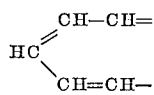

wherein the three valences are attached to the nitrogen atom, and Y is an anion, said R groups containing a total of not more than 12 carbon atoms in the substituent radicals. Also included are mixtures or blends of the above-described homopolymers and copolymers. Said polymeric salts particularly include the polymeric vinyl benzyl quaternary ammonium halides, especially the chlorides and bromides.

Halomethylation of the polymerized styrene compound is carried out by dissolving the styrene polymer in about 5 to about 20 parts by weight of halomethyl methyl ether per part of styrene polymer. A halomethylating catalyst, usually a Lewis acid such as stannic chloride, zinc bromide, zinch chloride, aluminum chloride, ferric chloride or antimony pentachloride, in the form of anhydrous granules or powder is introduced into the solution of styrene polymer in amounts ranging from about 15 to about 35 weight percent based on styrene polymer. Halomethylation of the styrene polymer proceeds at temperatures between 10° and 50° C. and at atmospheric pressures.

In carrying out halomethylation it is preferred to dilute the reaction mixture by adding one or more organic liquids, preferably volatile, and which are inert to the styrene polymer and are less reactive with the halomethyl methyl ether than the polymer. Examples of such organic liquids include the haloalkanes such as tetrachloroethane, chloroform, carbon tetrachloride, methylenechloride, ethylene dichloride, trichloroethane and the saturated aliphatic hydrocarbons such as normal heptane and isooctane.

When the desired amount of halomethylation is achieved, the halomethylating catalyst is deactivated by adding water or a mixture of water and dioxane. In the process of deactivating the catalyst an emulsion having an oil phase and an aqueous phase results with the halomethylated product being dissolved in the oil phase. For the purposes of this invention, an emulsion is defined as a colloidal dispersion of one liquid in another liquid, for example, oil-in-water emulsions, water-in-oil emulsions and mixtures of such emulsions.

At this point the emulsion wherein the oil phase contains the halomethylated product may be separated into two layers by dispersing in the emulsion up to about 100 p.p.m. by volume of a suitable polysiloxane. The oil layer containing the halomethylated product is then withdrawn and mixed with aqueous tertiary amine. However in most instances it is desirable to aminate the emulsified halomethylate product and thereby avoid an additional step.

The emulsified halomethylate product is readily aminated by adding a teritary amine or an aqueous solution thereof to the emulsion which is maintained at atmospheric to superatmospheric pressures and temperatures from about 20° to about 100° C. Animation may be carried out in the presence of an organic liquid, preferably volatile, which is a solvent for the halomethylated polymer and the amine, for example, the organic liquids used in the halomethylation step and others such as dioxane, toluene, or xylene or in the preesnce of a liquid which is a solvent for the amine such as water, acetone, or ethyl alcohol. Alternatively the reaction may be carried out by dispersing an oil solution of the chloromethylated polymer in a large excess of aqueous tertiary amine. The resulting amination mixture is still in the form of an oil-water emulsion; however, the aminated polymeric product is now dissolved in the aqueous phase. The resulting emulsion is stable.

In order to break the emulsion so that the organic liquid can be readily removed from the reaction mixture, a specified amount, preferably from about 25 to about 60 p.p.m. by volume based on the emulsion, of a suitable polysiloxane is dispersed in the emulsion. To facilitate dispersion of the polysiloxane in the emulsion, it is preferred to disperse from about 1 to about 50 parts by volume of the polysiloxane in 100 parts by weight of an aqueous medium prior to dispersing the polysiloxane in the emulsion. Such aqueous dispersions optionally contain up to about 6 weight percent based on the aqueous dispersion of a nonionic emulsifier, e.g., glycerol monostearate, polyoxyethylene monostearate, and the like, and up to about 3 weight percent based on the aqueous dispersion of a colloidal stabilizer such as methyl cellulose. Care must be taken that excess emulsifier not be used as excess emulsifier inhibits the emulsion breaking characteristics of the polysiloxane. Said aqueous dispersion is then advantageously added to the emulsion with stirring or other form of agitation so as to obtain a uniform distribution of the polysiloxane throughout the emulsion.

As the emulsion breaks, i.e., the aqueous and organic phases begin to separate, the organic layer, usually the lower layer, is withdrawn from the reaction mixture. Phase separation may be allowed to proceed to completion before the organic phase is withdrawn in a batchwise manner, or withdrawal may be carried out continuously by withdrawing both aqueous and organic phases as separation occurs. The polymeric vinyl benzyl quaternary ammonium salt remains dissolved in the aqueous layer and can be concentrated by evaporation of the aqueous layer.

In one embodiment of the invention wherein a haloalkane which is less reactive with the tertiary amine than the halomethylated polymer is used as the organic liquid diluent in the halomethylation step, essentially pure crystals of the reaction product of the haloalkane and the tertiary amine can also be isolated. Such crystals are isolated from the amination mixture by withdrawing the organic layer from the amination mixture and permitting the organic layer to stand at temperatures from room temperature to about 80° C. for a period from about 1 to about 12 hours. In a preferred embodiment to withdrawn organic layer is refluxed at temperatures at about 80° C., and the resulting crystals are separated from the organic layer by filtration of centrifugation. Said crystals may then be washed with acetone or methylene chloride and dried in air or vacuum. Aminated haloalkanes typically recovered by this method include 2-chloroethyltrimethylammonium chloride, chloromethyltrimethylammonium chloride and the like.

The following examples are given as illustrations of the ways in which the improvement of this invention may be utilized, but are not to be construed as limiting the invention. In the following examples, all parts and percentages are by weight unless otherwise indicated.

EXAMPLE 1

A charge of 46 parts of chloromethyl methyl ether and 65 parts ethylene dichloride is placed in a jacketed glass lined reaction vessel equipped with a reflux condenser and a stirrer. It is stirred and 10 parts of granular molding grade polystyrene is dissolved therein at room temperature. Thereafter 1.7 parts of anhydrous zinc chloride is added to the solution as chloromethylation catalyst, and stirring of the mixture is continued over a reaction period of 8.5 hours. The temperature of the mixture is maintained between 25° C. and 50° C. over the remainder of the reaction period. The chloromethylation reaction is stopped by adding to the mixture a minimum of 30 parts of water. The pH of the reaction mixture is adjusted to basic by addition of sodium hydroxide and to the basic reaction mixture is then added 80 parts of an aqueous solution containing 25 percent of trimethyl amine. The reaction vessel is closed and the mixture is agitated over a 24-hour period to aminate the chloromethylated polymer. The amination mixture is in the form of an emulsion of the ethylene dichloride phase in the aqueous phase which contains the polymeric vinyl benzyl trimethylammonium chloride. At this point 125 p.p.m. by volume based on the emulsion of an aqueous dispersion consisting of 30 percent of dimethyl polysiloxane containing a small amount of silica, 1.6 percent of methyl cellulose, 1.5 percent of ascorbic acid and 66.9 percent of water is added with stirring to the emulsion heated to 50° C. The emulsion separates into two layers within 4 hours and the lower layer, i.e., the ethylene dichloride layer is withdrawn and set aside. The remaining aqueous layer is concentrated to about 30 percent of the ammonium salt by distilling at atmospheric pressure and 100° C. for a period of 4 hours.

For the purposes of comparison and to particularly point out the advantages of the improvement of this invention, the above described procedure is followed except that no de-emulsifying aqueous dispersion is added and the organic and aqueous liquids are removed by evaporation. Following this procedure, evaporation to the same concentration of the polymeric vinyl benzyl quaternary ammonium salt requires 25 hours.

For the purposes of comparison several runs are carried out according to the procedure of this example except that different amounts of the aqueous dispersion of 30 percent dimethyl polysiloxane are used. The de-emulsifying efficiencies at different concentration of the de-emulsifying agent in terms of milliliters of ethylene dichloride phase separating per minute are shown in the following Table I. Also for the purposes of comparison, the rate of separation of a control sample (C) wherein no de-emulsifying agent is added is shown in Table I.

TABLE I

| | Concentration of de-emulsifying agent, p.p.m. [1] | De-emulsifying efficiency ml./min. [2] | | |
|---|---|---|---|---|
| | | After 10 minutes | After 40 minutes | After 60 minutes |
| Sample number: | | | | |
| 1 | 15.0 | .3 | .33 | .30 |
| 2 | 30.0 | .65 | .39 | .35 |
| 3 | 37.5 | .8 | .44 | .37 |
| 4 | 45.0 | .5 | .4 | .33 |
| 5 | 60.0 | .15 | .26 | .26 |
| C | 0 | None detectable after 70 minutes | | |

[1] Concentration in p.p.m. by volume of the polysiloxane based on the volume of total emulsion.
[2] Milliliters of ethylene dichloride phase separating per minute in a 100 ml. portion of the emulsion which contains about 25 ml. of the ethylene dichloride phase. The temperature of the emulsion is maintained at 50° C. throughout the separation. Separation is complete after 60 minutes.

EXAMPLE 2

Several runs are carried out according to the procedure of Example 1 except that the polysiloxane additive is added in different forms. The de-emulsifying efficiencies of the agents in terms of milliliters of ethylene dichloride separating per minutes are shown in the following Table II.

TABLE II

| Additive | Concentration, p.p.m.[1] | De-emulsifying efficiency, (ml./min.)[2] | | |
|---|---|---|---|---|
| | | After 10 minutes | After 40 minutes | After 70 minutes |
| Sample No.: | | | | |
| 1 — 10% aqueous dispersion of dimethyl polysiloxane. | 10 | NO | .24 | .16 |
| 2 — do | 20 | .10 | .50 | .30 |
| 3 — 30% aqueous dispersion of dimethyl polysiloxane. | 15 | ND | .33 | .21 |
| 4 — do | 30 | .35 | .54 | .31 |

[1] Concentration in p.p.m. by volume of the polysiloxane based on the volume of the total emulsion.
[2] Same as ([2]) in Table I.
NOTE.—ND—non detectable.

EXAMPLE 3

The ethylene dichloride phase which was withdrawn according to Example 1 is refluxed in a closed vessel at 80° C. for a period of 2 hours. The resulting crystals of 2-chloroethyltrimethylammonium chloride are collected by filtration, washed with acetone and are air dried.

EXAMPLE 4

A 10-part portion of granular molding grade polystyrene is chloromethylated according to the procedure described in Example 1. The chloromethylation reaction is stopped by adding to the reaction mixture a minimum of 30 parts of water. The addition of water results in the formation of an emulsion having an aqueous phase and an oil phase containing the chloromethylated product, i.e., vinyl benzyl chloride polymer. At this point 63 p.p.m. by volume based on the emulsion of an aqueous dispersion consisting of 30 percent of dimethyl polysiloxane containing a small amount of silica, 1.6 percent of methyl cellulose, 1.5 percent of ascorbic acid and 66.9 percent of water is added with stirring to the emulsion. The emulsion separates into two layers within ½ hour and the lower layer, i.e., the ethylene dichloride layer containing the vinyl benzyl chloride polymer is withdrawn and washed.

What is claimed is:

1. In a process for preparing vinyl benzyl halide polymers and quaternary ammonium salts of such polymers, which process comprises the steps of:
   (a) halomethylating a styrene polymer with halomethyl methyl ether in an orgainic liquid in the presence of a halomethylating catalyst to form a vinyl benzyl halide polymer, said organic liquid being inert to the styrene polymer and less reactive with the halomethyl methyl ether than the styrene polymer, and
   (b) adding an aqueous liquid to deactivate the halomethylating catalyst and thereby forming an emulsion having an organic liquid phase and an aqueous liquid phase; the improvement which comprises (1) dispersing in the emulsion up to about 100 p.p.m. by volume based on the emulsion of a water-dispersible polysiloxane having the configuration

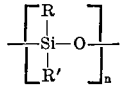

wherein R and R' each represents individually a monovalent hydrocarbon radical and $n$ is the average number of units in the polysiloxane molecule and (2) withdrawing the resulting organic liquid layer from the resulting aqueous layer.

2. The improvement according to claim 1 wherein the vinyl benzyl halide polymer is reacted with a tertiary amine in an aqueous medium to form a polymer of a quaternary ammonium salt having the formula:

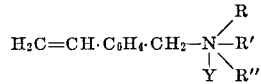

wherein R, R' and R'' each represents individually a monovalent radical selected from the group consisting of $CH_2OH-CH_2-$, $CH_3-CHOH-CH_2$, $$CH_2OH-CHOH-CH_2-$$

and alkyl, aryl, cycloalkyl and aralkyl hydrocarbon radicals, and R, R' and R'' collectively represent the trivalent radical of the formula

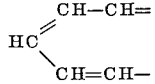

wherein the three valences are attached to the nitrogen atom, and Y is an anion, said R groups containing a total of not more than 12 carbon atoms, said salt being dissolved in the aqueous medium.

3. The improvement according to claim 1 wherein the polysiloxane is dimethyl polysiloxane.

4. The improvement according to claim 3 wherein the dimethyl polysiloxane is in the form of an aqueous dispersion.

5. The improvement according to claim 1 wherein the organic liquid is ethylene dichloride.

6. The improvement according to claim 1 wherein the halomethylating catalyst is zinc chloride.

7. The improvement according to claim 1 wherein the styrene polymer is polystyrene.

8. In a process for process for preparing polymers of vinyl benzyl quaternary ammonium salts having the general mormula:

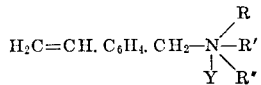

wherein R, R' and R'' each represents individually a monovalent radical selected from the group consisting of $CH_2OH-CH_2-$, $CH_3-CHOH-CH_2-$, $$CH_2OH-CHOH-CH_2-$$

and alkyl, aryl, cycloalkyl and aralkyl hydrocarbon radicals, and R, R' and R'' collectively represent the trivalent radical of the formula

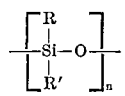

wherein the three valences are attached to the nitrogen atom, and Y is an anion, said R groups containing a total of not more than 12 carbon atoms in the substituent radicals wherein the process comprises the steps of:
   (a) halomethylating a styrene polymer with halomethyl methyl ether in an organic liquid in the presence of a halomethylating catalyst to form a vinyl benzyl halide polymer, said organic liquid being inert to the styrene polymer and less reactive with the halomethyl methyl ether than the styrene polymer, and
   (b) adding to the resulting reaction mixture of step (a) a tertiary amine and an aqueous medium to deactivate the halomethylating catalyst and thereby forming an emulsion having an organic liquid phase and an aqueous phase having the resulting quaternary ammonium salt of the vinyl benzyl halide polymer dissolved therein; the improvement which comprises (1) dispersing in the emulsion up to about 100 p.p.m. by volume based on the emulsion of a water-dispersible polysiloxane having the configuration

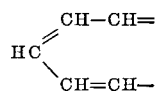

wherein R and R' each represents individually a monovalent hydrocarbon radical and $n$ is the average number of units in the polymer molecules and (2) withdrawing the resulting organic liquid layer from the resulting aqueous layer having dissolved therein the quaternary ammonium salt.

9. The improvement according to claim 8 wherein the tertiary amine is trimethyl amine.

10. The improvement according to claim 8 wherein (1) the organic liquid is ethylene dichloride, (2) the halomethylating catalyst is zinc chloride, (3) the tertiary amine is trimethyl amine and (4) the polysiloxane is dimethyl polysiloxane.

11. In a process for preparing polymers of vinyl benzyl quaternary ammonium salts wherein the process comprises the steps of:
   (a) halomethylating a styrene polymer with halomethyl methyl ether in a liquid haloalkane in the presence of a halomethylating catalyst to form a vinyl benzyl halide polymer, said haloalkane being inert to the styrene polymer, less reactive with the halomethyl methyl ether than the styrene polymer and less reactive with a tertiary amine than the vinyl benzyl halide polymer, and
   (b) adding to the resulting reaction mixture of step (a) a tertiary amine and an aqueous medium to deactivate the halomethylating catalyst and thereby forming an emulsion having an oil phase and an aqueous phase having the resulting quaternary ammonium salt of the vinyl benzyl halide polymer dissolved therein; the improvement for recovering the resulting reaction product of the haloalkane and tertiary amine which comprises (1) dispersing in the emulsion up to about 100 p.p.m. by volume based on the emulsion of a water-dispersible polysiloxane having the configuration

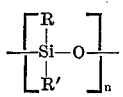

wherein R and R' each represents individually a monovalent hydrocarbon radical and $n$ is the average number of units in the polymer molecules, (2) withdrawing the resulting oil layer from the resulting layer of aqueous phase having dissolved therein the quaternary ammonium salt, (3) permitting the withdrawn oil layer to stand at a temperature from about room temperature to about 80° C. for a period from about 1 to about 12 hours and (4) recovering the resulting crystals of said reaction product from the oil layer.

12. The method according to claim 11 wherein the haloalkane is ethylene dichloride.

References Cited
UNITED STATES PATENTS 2,694,702  11/1954  Jones _____ 260—93.5
3,337,480   8/1967  Small _____ 260—93.5

JAMES A. SEIDLECK, Primary Examiner

U.S. Cl. X.R.

117—161; 260—29.6, 89.7